United States Patent
Koch et al.

(10) Patent No.: US 6,714,995 B2
(45) Date of Patent: Mar. 30, 2004

(54) METHOD AND APPARATUS FOR ARCHIVING, UPDATING OR RETRIEVING AN UNINITIALIZED ENTRY IN AN ADVANCED INTELLIGENT NETWORK

(75) Inventors: Robert A. Koch, Norcross, GA (US); Dale W. Malik, Atlanta, GA (US); Scott Crandall Holt, Smyrna, GA (US); Ward M. Chewning, III, Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 501 days.

(21) Appl. No.: 09/849,696

(22) Filed: May 4, 2001

(65) Prior Publication Data

US 2001/0044859 A1 Nov. 22, 2001

Related U.S. Application Data

(62) Division of application No. 09/350,882, filed on Jul. 9, 1999, now Pat. No. 6,275,872.

(51) Int. Cl.[7] .................................................. G06F 3/00
(52) U.S. Cl. ................................ 710/5; 710/65; 710/74
(58) Field of Search ................................ 711/159, 152, 711/114, 117, 154, 161, 170, 179; 379/111, 130; 714/35; 370/338, 335; 709/213–215, 104; 710/5, 6, 19, 62–64, 74

(56) References Cited

U.S. PATENT DOCUMENTS

| | | | | | |
|---|---|---|---|---|---|
| 5,570,410 | A | * | 10/1996 | Hooshiari | 379/111 |
| 5,584,008 | A | * | 12/1996 | Shimada et al. | 711/114 |
| 5,926,834 | A | * | 7/1999 | Carlson et al. | 711/152 |
| 5,933,853 | A | * | 8/1999 | Takagi | 711/159 |
| 5,940,483 | A | * | 8/1999 | Shaffer et al. | 379/130 |
| 6,206,584 | B1 | * | 3/2001 | Hastings | 714/35 |
| 6,452,915 | B1 | * | 9/2002 | Jorgensen | 370/338 |

* cited by examiner

Primary Examiner—Jeffrey Gaffin
Assistant Examiner—Joshua D Schneider
(74) Attorney, Agent, or Firm—Nora M. Tocups, Esq.

(57) ABSTRACT

Methods and apparatus for obtaining capacity in the storage of an intelligent peripheral or other network element for additional entries without losing information relating to entries that have already been held in the storage. Such capacity is obtained by selecting certain entries from the storage, by sending the entry information as opposed to the certain entries to a repository, and by deleting the certain entries from the storage. Also, methods and apparatus are provided to retrieve the entry information that has been sent to the repository when such entry information is needed. Further, methods and apparatus are provided to update as necessary the entry information that has been sent to the repository.

6 Claims, 6 Drawing Sheets

METHOD AND APPARATUS FOR ARCHIVING, UPDATING OR RETRIEVING AN UNINITIALIZED ENTRY IN AN ADVANCED INTELLIGENT NETWORK

CROSS REFERENCE TO RELATED APPLICATION

This is a divisional of U.S. patent application Ser. No. 09/350,882, filed on Jul. 9, 1999, now U.S. Pat. No. 6,275,872.

FIELD OF THE INVENTION

The invention generally relates to the field of telecommunications, and particularly relates to the field of storage of information relative to entries or subscriptions in elements of a telecommunications system.

BACKGROUND

A telecommunications system generally stores and accesses information in the course of providing telecommunication services to subscribers. This information relating to a subscriber is referred to herein as an entry or as a subscription. Typically, a telecommunications system stores the entry or subscription relating to the subscriber in connection with a service or services that are provided through an advanced intelligent network (AIN). The entry or subscription is generally stored in storage like the memory of an AIN element such as an intelligent peripheral (IP) or a service circuit node (SCN), which is used to provide the service. In some intelligent peripherals, a designated area of storage is reserved for such entries or subscriptions, and is referred to herein as reserved storage.

With the popularity of AIN services, an intelligent peripheral may come to store a great number of entries or subscriptions. In fact, the storage or the reserved storage for such entries or subscriptions may fill to high levels or even to capacity with entries or subscriptions. In some cases, when the storage or reserved storage fills to high levels, it becomes difficult to re-initialize or re-construct the storage or reserved storage. The high levels in storage or reserved storage may lead to crashes during the re-initialization or re-construction procedures. Out-of-the-ordinary methods for re-initializing or re-constructing the storage or reserved storage must be undertaken. Thus, high levels of entries or subscriptions in storage or reserved storage are generally avoided.

When its storage or reserved storage is full of entries or subscriptions, the intelligent peripheral also may suffer the crashes described above. Once the storage or reserved storage reaches a high level or is filled to capacity, the intelligent peripheral generally cannot be used to serve additional subscribers. In sum, the storage capacity or reserved storage capacity of the intelligent peripheral may act as a limitation on the number of subscribers that may be served by the intelligent peripheral.

Efforts have been made to find a way to add subscribers to a service or services when the storage capacity or reserved storage capacity of the intelligent peripheral providing the service(s) rises to high levels or has been filled. Consideration has been given to the idea of adding one or more intelligent peripherals or other network elements for use in providing the service(s) to the additional subscribers. Generally, this idea has been discarded because the addition of another intelligent peripheral or other network element involves costs as yet unjustified by the profits to be gained from the additional subscribers. These costs can run into the millions of dollars.

Given the desire to add subscribers but to avoid adding an intelligent peripheral or other network element, efforts have been made to find a way to maximize the number of entries or subscriptions that may be stored in an intelligent peripheral. Consideration has been given to the idea of reconfiguring the use of the overall storage and memory facilities of the AIN. For example, load balancing could be implemented so as to move entries or subscriptions from a heavily loaded intelligent peripheral to a less loaded intelligent peripheral or other network element. As with the idea of adding an intelligent peripheral, this idea of load balancing has problems. Such load balancing requires a great deal of network operations carried out on a continuing basis. In other words, continual oversight of the loads of the various network elements and execution of operations is required to keep the loads balanced. The large scale of the operations and their continuing nature make this an expensive approach. In addition, load balancing would serve only as a stop-gap measure. As the number of subscribers increased, there would be fewer less loaded intelligent peripherals to which the heavier loaded intelligent peripherals could transfer some of their loads. Eventually, all of the intelligent peripherals would top out.

Thus, there exists a need for a method or system that maximizes the number of entries or subscriptions that may be stored in an intelligent peripheral. In particular, there exists a need for such a method or system that accomplishes such maximization without the addition of an AIN element such as an intelligent peripheral to the telecommunications system. Further, there exists a need for such a method or system that accomplishes such maximization without the necessity of large scale network operations carried out on a continual basis. In addition, there exists a need for such a method or system that accomplishes such maximization for the relatively long term rather than as a stop gap measure. Finally, there exists a need for such a method or system that accomplishes such maximization efficiently and economically so as to best serve the subscribers and the service provider of the telecommunications system.

SUMMARY OF THE INVENTION

The present invention includes embodiments that obtain capacity in the storage of an intelligent peripheral or other network element for additional entries or subscriptions without losing information relating to entries or subscriptions that have already been held in the storage. The exemplary embodiments obtain such capacity in storage by selecting certain entries or subscriptions from the storage, by sending the entry information (as opposed to the entries or subscriptions themselves) of these certain entries or subscriptions to a repository, and then by deleting the certain entries or subscriptions from the storage. The present invention also includes embodiments that retrieve the entry information that has been sent to the repository when such entry information is needed. In addition, the present invention includes embodiments that update as necessary the entry information that has been sent to the repository.

Advantageously, the exemplary embodiments of the present invention make use of the finding that storing uninitialized entries in memory units reserved in the storage of an intelligent peripheral results in a lot of empty spaces or empty memory in storage. Yet, the empty space in a memory unit cannot be used for other needs because the empty space generally is reserved for information that later may be added to the entry associated with the memory unit. The empty space may be filled when the entry's status is changed from an uninitialized entry to an initialized entry when generally subscription information is added to the entry for storage and use in a subscriber's telecommunications service.

The exemplary embodiments also make use of the finding that generally uninitialized entries are mere place holders in storage and are not used as uninitialized entries in the service of a subscriber. Yet, the entry information of initialized entries must remain available in case a subscriber decides to initialize his or her service. Based on these findings, the exemplary embodiments obtain capacity in storage by developing an uninitialized list including only uninitialized entries from the entries included in the storage of the intelligent peripheral. The entry information for each of the uninitialized entries in the uninitialized list is sent from the storage to the repository of the intelligent peripheral. It is advantageous that pursuant to the exemplary embodiments an uninitialized entry is not sent to the repository in the specific format in which it is typically stored in a memory unit reserved in the storage. Rather, the entry information of the uninitialized entry is sent to the repository. Such entry information may be held in a relatively small area of memory in a repository that is readily accessible. The uninitialized entries in the uninitialized list then are deleted from the storage. Thus, the repository can be used to effectively hold a lot of entry information pertaining to uninitialized entries in a smaller amount of space in comparison to the storage of uninitialized entries in a specified format in the storage of the intelligent peripheral. In other words, the repository need not have the capacity of the storage to effect the implementation of significant space savings in the storage of the intelligent peripheral.

With respect to the exemplary embodiments, the term "archiving" is used generally to refer to the development of an uninitialized list including only uninitialized entries from the entries included in the storage of the intelligent peripheral, the transmission of the entry information for each of the uninitialized entries in the uninitialized list from the storage to the repository of the intelligent peripheral, and the deletion of the uninitialized entries in the uninitialized list from the storage. To provide a shortcut to archiving, a list of candidates may be developed from the uninitialized entries in the storage. When a decision to archive is made, then the list of candidates may serve as the basis for the development of the uninitialized list. A candidate in the list of candidates has a corresponding uninitialized entry in the entries included in the storage of the intelligent peripheral. Each candidate may include an identifying characteristic with regard to the corresponding uninitialized entry of the candidate so that the identifying characteristic may be used to find the corresponding uninitialized entry in the development of the uninitialized list.

The list of uninitialized entries may be developed from the list of candidates or from the uninitialized entries in storage in a number of different ways. For example, the list of uninitialized entries may be developed so as to include uninitialized entries having a specific characteristic. The specific characteristic may be a date and/or time stamp that is earlier than a selected date and/or time. By using a date and/or time stamp as a specific characteristic, the uninitialized list may be developed so as to include only uninitialized entries that have been stored for a certain amount of time in storage. As another example, the list of uninitialized entries may be developed so as to include uninitialized entries having the earliest sequence numbers. Generally, an uninitialized entry having an early sequence number will have been held in storage longer than an uninitialized entry having a later sequence number.

The present invention provides embodiments that may be used to retrieve entry information that has been sent to the repository when such entry information is needed. Typically, such entry information is needed when an initialization request has been received with respect to an uninitialized entry. A determination is made as to whether the entry information of the uninitialized entry is held in the repository. If it is held in the repository, then the entry information is retrieved from the repository to the storage. The uninitialized entry may be initialized by adding initialization information to the entry information so as to create an initialized entry. The initialized entry then may be stored in the storage.

The present invention also provides embodiments that respond to the receipt of an update for an uninitialized entry where the entry information for that uninitialized entry has been sent to the repository. In response to receiving such an update, the update is stored in the storage. If an initialization request is received for uninitialized entry, then the update in storage is initialized so as to create an initialized entry, which is stored in storage. A decision may be made to archive the update, and in that case, the entry information of the update is included in an uninitialized list. The entry information of the update then is sent from the storage to the repository. The update is deleted from storage. With respect to the entry information of the update that is sent to the repository, a write-over of this entry information is effected with respect to the entry information of the uninitialized entry in the repository.

By these exemplary embodiments, the present invention maximizes the number of entries and subscriptions that may be stored in an intelligent peripheral. In particular, the exemplary embodiments accomplish such maximization without the addition of an AIN element such as an intelligent peripheral to the telecommunications system. Further, the exemplary embodiments accomplish such maximization without the necessity of large scale network operations carried out on a continual basis. In addition, the exemplary embodiments accomplish such maximization for the relatively long term rather than as a stop gap measure. Finally, the exemplary embodiments accomplish such maximization efficiently and economically so as to best serve the subscribers and the service providers of the telecommunications system.

These and other objects, features, and advantages of the present invention may be more clearly understood and appreciated from a review of the following detailed description of exemplary embodiments and by reference to the drawings and the claims.

DETAILED DESCRIPTION

The present invention includes embodiments that obtain capacity in the storage of an intelligent peripheral or other network element for additional entries or subscriptions without losing information relating to entries or subscriptions that have already been held in the storage. Advantageously, exemplary embodiments obtain such capacity in storage by selecting certain entries or subscriptions in the storage, by sending the entry information (as opposed to the entries or subscriptions themselves) of these certain entries or subscriptions to a repository, and then by deleting the certain entries or subscriptions from the storage. The present invention also includes embodiments that retrieve the entry information of the certain entries or subscriptions that have been sent to the repository when such entry information is needed. In addition, the present invention includes embodiments that update as necessary the entry information of the certain entries or subscriptions that has been sent to the repository.

Figure 1:
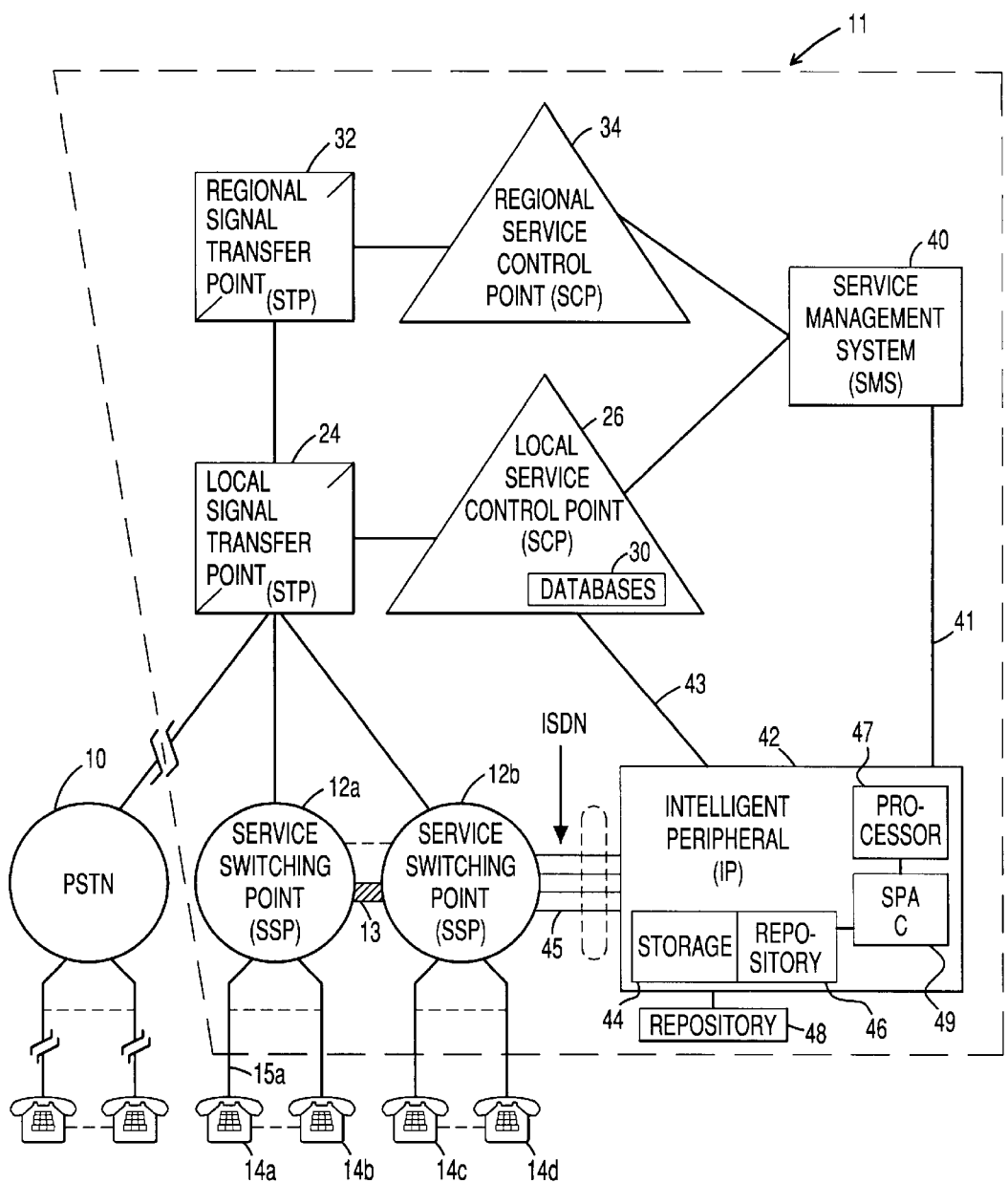
FIG. 1 illustrates an exemplary environment and a block diagram of an exemplary embodiment of the present invention.

This detailed description first provides a brief explanation of an exemplary environment as it may be used in connection with exemplary embodiments of the present invention and as illustrated in FIG. 1. Advantages of the increased storage capacity wrought by the exemplary embodiments are illustrated in FIGS. 2A–2D. An exemplary general method of archiving is described with reference to FIG. 3. Additional optional sub-steps to the development of a list of uninitialized entries is described with reference to FIG. 4. An exemplary method of updating an uninitialized entry is described with reference to FIG. 5. An exemplary method relating to the retrieval of an uninitialized entry is described in connection with FIG. 6.

Exemplary Environment As Used with Exemplary Embodiments—FIG. 1

FIG. 1 is a diagram of an exemplary embodiment and exemplary environment for operation of methods and apparatuses of the present invention. This exemplary environment is the public switched telecommunications network (PSTN) 10. A portion 11 of the PSTN is illustrated in FIG. 1 and described generally below. In particular, the detailed portion 11 of the PSTN illustrates a part of the Advanced Intelligent Network (AIN) of a typical local exchange carrier (LEC). For brevity, only a basic explanation of the PSTN 10 is provided herein. For further information regarding the PSTN 10 and AIN aspects thereof, the interested reader is referred to the commonly assigned patent to Weisser, U.S. Pat. No. 5,430,719, which is incorporated herein by reference.

The AIN includes a variety of interconnected network elements. A group of such network elements includes the plurality of central offices which are indicated as service switching points (SSPs) 12a, 12b in FIG. 1. As further illustrated in FIG. 1, the SSPs 12a, 12b have a plurality of calling lines connected thereto. Each calling line is connected typically to a piece of terminating equipment including a plurality of telephones commonly indicated as 14a, 14b, 14c and 14d.

SSPs 12a, 12b are interconnected by a plurality of trunk circuits 13. These are the voice path trunks that interconnect the SSPs to connect communications. Each of the SSPs 12a, 12b is connected to another type of AIN element referred to as a local signal transfer point (STP) 24 via respective data links using the Signaling System 7 (SS7) protocol. Much of the intelligence of the AIN resides in yet another type of AIN element referred to as a local service control point (SCP) 26 that is connected to STP 24 over an SS7 data link. Among the functions performed by the SCP 26 is the maintenance of network databases and subscriber databases as represented collectively by databases 30. These databases 30 may be used in providing telecommunication services to a subscriber. Typically, the SCP 26 includes service package applications (SPAs) that are used in connection with or as part of the databases 30 in the application of telecommunication services or enhanced features to calling lines.

The local STP 24 may be connected to other network elements of the PSTN 10 through a regional STP 32, which in turn, may be connected to a regional SCP 34. Both regional SCP 34 and local SCP 26 are connected via respective data links to a service management system (SMS) 40. The SMS 40 interfaces to business offices of the local exchange carrier (LEC) and interexchange carriers (IXCs). The SMS 40 also is connected via data link 41 to one or more intelligent peripherals such as the illustrated intelligent peripheral (IP) 42. By this data link 41, the SMS 40 provides the intelligent peripheral (IP) 42 with information relating to new subscribers and updates for existing subscribers, and with information relating to network operations such as new services, upgrades to existing services, measurements, audits, and maintenance.

The intelligent peripheral 42 that receives information from the SMS may be a service circuit node (SCN) or other element. IP 42 is connected to the local SCP 26 via a data link 43. In addition, the IP 42 is connected to one or more (but usually only a few) SSPs via Integrated Service Digital Network (ISDN) links 45 as shown by the connection to SSP 12b.

In addition, IP 42 typically includes storage 44 for data and information such as the entries and subscriptions described below in connection with FIG. 2A. Typically, such storage 44 is memory for data that is addressed in real-time, and particularly for data that is addressed in real-time in the course of providing telecommunication services to a subscriber such as in the course of a call. As is described below in connection with FIG. 2A, the storage 44 includes entries or subscriptions with each of the entries or subscriptions being held respectively in a memory unit reserved in the storage. As noted in the background, all of the storage 44 may not be allocated for holding the entries or subscriptions. Rather, a limited area of storage 44 may be reserved for holding the entries or subscriptions. In other words, the storage 44 may hold only a limited number of addressable entries or subscriptions. As used herein, the term "storage" refers to the case where all of the storage is used for entries or subscriptions, to the case where a limited area or portion of the storage is used for entries or subscriptions, or to the case where a limited number of addressable entries are held in storage.

The storage 44 generally is used in conjunction with a functionally or directly connected processor 47 and/or service package application (SPA) 49. Either or both the processor 47 and SPA 49 may include the service logic for operation or delivery of a telecommunications service or other function. In some embodiments of the present invention, the terms "SPA" and "processor" may be used interchangeably because the operations that are carried out with respect to the storage 44 and the repository 46, 48 may come about through the operation of the service logic in the processor 47 and/or the SPA 49, or through a combination thereof.

IP 42 also includes a repository 46 and/or a repository 48 that may be functionally or directly connected to storage 44 and to the processor 47 and/or SPA 49. Typically, the repository 46, 48, is memory for data that is not addressed in real-time, and particularly for data that is not addressed in real-time in the course of providing telecommunication services to a subscriber such as in the course of a call. In exemplary embodiments of the present invention, the repository 46, 48 is used in an atypical manner in that the repository 46, 48 is used (as explained in further detail below in connection with FIGS. 2A–2D) to store the entry information for each of the uninitialized entries that has been sent to the repository 46, 48 from the storage 44.

As illustrated in FIG. 1, the IP 42 may include a repository 46 that is integral with the IP 42 such as a memory card, or other device. Alternatively, or in addition, the IP 42 may be functionally connected to a repository 48 that is not integrated with the IP 42. For example, the repository 48 may be: memory in a stand-alone device; memory in a service control point that is accessed using X.25 protocol or otherwise; memory in another intelligent peripheral such as a service circuit node that is accessed over ISDN lines or otherwise; and/or memory on an Internet Server that is accessed over TCP/IP lines or otherwise. For brevity, we refer to "repository 46, 48" herein to include either repository 46, repository 48, and/or both.

In the detailed description below, the reader's attention will be drawn to operation of exemplary embodiments of the present invention in connection with SMS 40, the intelligent peripheral 42, storage 44, repository 46, 48, processor 47 and SPA 49.

Exemplary Operation—FIGS. 2A–2D

Some of the advantages of the present invention may most readily be understood from the visual aids illustrated in FIGS. 2A–2D. To provide telecommunications service to a subscriber, the telecommunications system may require information about the subscriber. Generally, such information is stored in the storage 44 of an intelligent peripheral 42. Such subscriber information is usually referred to as a subscription. Herein, the term "entry" is used as well as the term "subscription". The term "entry" includes the term "subscription", but herein the term "entry" is used in a broader sense than the term "subscription". A subscription generally includes data relating to a particular subscriber. An entry also may include other data whose components are related such as through a connection to a particular subscriber, and/or may include other data whose components may not bear any relation to each other or even to a subscriber. Hereinafter, only the term "entry" is used so as to encompass the term "subscription" a well as other meanings that the term "entry" may have.

As noted, to provide service to a subscriber, the telecommunications system may require information about the subscriber. With respect to some services, this information is gathered from the subscriber in two stages. The first stage generally occurs when the subscriber contracts with or otherwise arranges for the service from or with the telecommunications system or service provider. The information gathered in this first stage is referred to herein as "entry information". An entry that includes only entry information is referred to herein as an uninitialized entry. The second stage of gathering information generally occurs when the subscriber first uses the service or otherwise first initializes the service. An entry relating to a subscriber that includes subscription information also includes entry information, and as such, is referred to herein as an initialized entry. But the terms "initialized entry" and "uninitialized entry" should not be limited to the context of information associated with a telecommunications service provided to a subscriber. As noted, an entry may include data and components unrelated to a subscriber or telecommunications service. An uninitialized entry may be thought of as an entry that includes core information such as the entry information described herein. The uninitialized entry changes its status to an initialized entry upon the receipt of additional information such as subscription information. Thus, an initialized entry is an entry that includes core information such as the entry information as well as additional information such as the subscription information.

Storage 44 typically includes memory or an area of memory that further includes memory units. As used herein, a memory unit is an area of storage 44 that is reserved for an entry. Generally, all of the memory units in storage 44 are of the same size. Further, a memory unit is configured so as to include the entry information and the subscription information of an initialized entry.

Figure 2D:
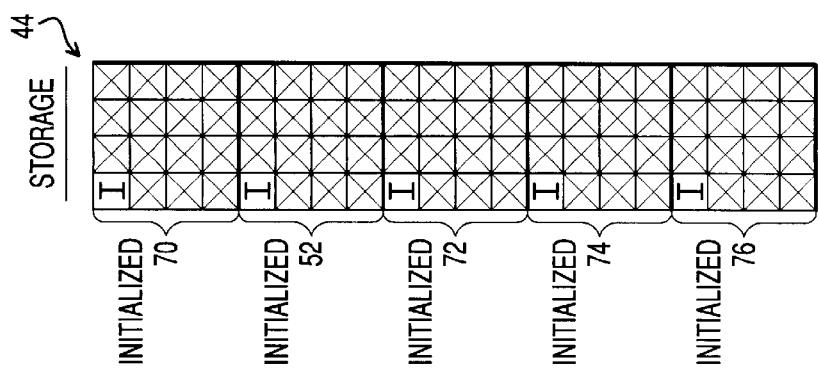
FIGS. 2A, 2B, 2C, and 2D illustrate representations of the storage and repository of the intelligent peripheral and lists of candidates or uninitialized entries as may be used in exemplary embodiments.
Figure 2C:
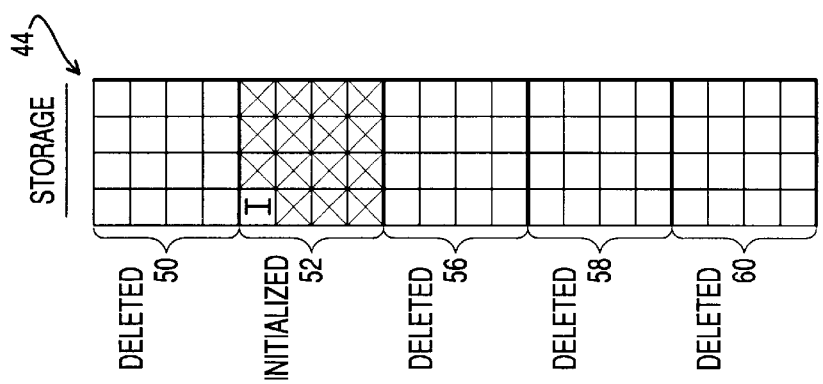
Figure 2B:
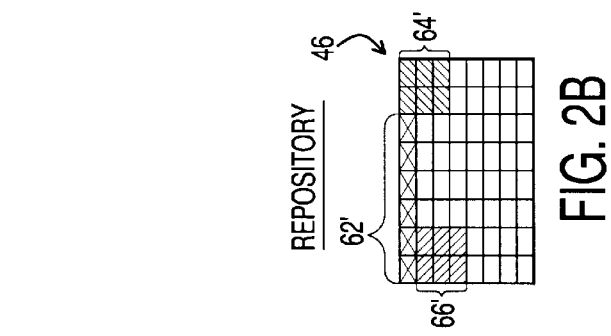
Figure 2A:
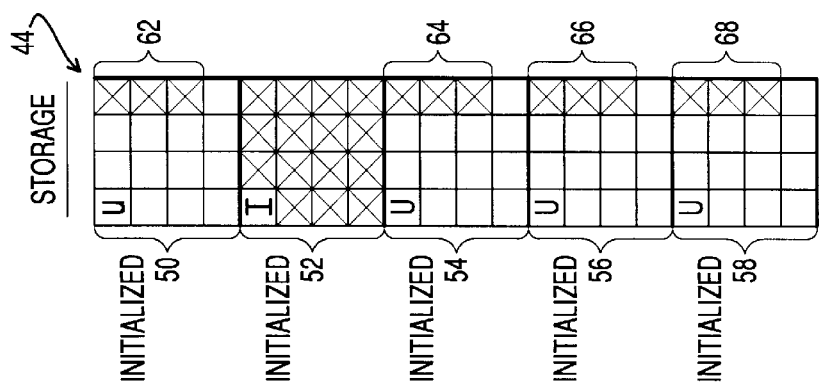

In particular, FIG. 2A illustrates a representation of the storage 44 of the IP 42. The storage 44 may be called by a processor 47 or service package application (SPA) 49 for information in the course of providing a service to a subscriber. As illustrated, storage 44 includes five entries 50, 52, 54, 56 and 58 with each of the entries being stored respectively in a memory unit. Each entry may relate to a respective subscriber and may relate to one or more services to be provided to the subscriber. The entry information, and if present, the subscription information of an entry are included in the memory unit in a specific format so the information may most readily be used in providing the service. The specific format may include designated fields for holding, respectively, certain types of information. To illustrate this point, each entry 50, 52, 54, 56, and 58 in storage 44 is shown as having an arbitrary number of sixteen fields.

As noted, the storage 44 of IP 42 includes two types of entries: uninitialized entries; and initialized entries. Generally, a flag or other marker is set within the entry so as to indicate whether an entry is an initialized entry or an uninitialized entry. To illustrate the use of this flag or marker, each of the entries in storage 44 in FIG. 2A has been marked with either a "U" to indicate an uninitialized entry or an "I" to indicate an initialized entry. As noted, an uninitialized entry includes entry information relating to a subscriber with respect to a service to which the subscriber has subscribed, but which has not been initialized, i.e., an uninitialized service. A service generally remains uninitialized until it has been turned on. Until the service is uninitialized, the associated uninitialized entry generally does not come into use except for updates or other maintenance events.

Typically, a service is initialized once the subscriber first makes use of it or by the subscriber calling a service number, or in some other fashion such as the service provider initializing the service. An initialized service may be thought of as a service that has been turned on. After a service is initialized, typically the associated initialized entry comes into use in that the initialized entry is addressed by the processor or SPA whenever the service is to be provided to the subscriber. Thus, it is important the initialized entry be stored in real-time memory such as storage 44 so that it may be readily addressed and used in providing service to the subscriber.

Generally, when a subscriber subscribes to a service, information is provided to the storage 44 of the IP 42 so as to create an uninitialized entry for the subscriber for that service. The appropriate fields of a memory unit are filled pursuant to the specific format with the entry information for the entry. The entry information of this uninitialized entry typically includes a minimal amount of information such as: the directory number (DN) associated with the subscriber; a sequence number of the entry; a date/time stamp for the entry; and/or an uninitialized flag or marker. Of course, the entry information may include other information as appropriate. As noted, the appropriate fields of the memory unit are filled with the entry information. The other fields of the memory unit for this entry are reserved by leaving them, empty or in other ways so as to later accommodate subscription information should the entry change its status to an initialized entry, or for other reasons.

Of the five entries in storage 44 shown in FIG. 2A, there are four uninitialized entries 50, 54, 56, and 58. These uninitialized entries include respectively entry information in three of their sixteen fields of a memory unit. The other fields of the respective memory units are reserved and illustrated as empty in each of the uninitialized entries. These fields are usually only filled when the entry changes its status from an uninitialized entry to an initialized entry. During the process of turning on a service or otherwise initializing it, subscription information may be collected and held in the previously reserved or empty fields of the memory unit of the entry. This subscription information may be collected from the subscriber or in other ways. This other information may include: a personal identification number (PIN); a speed dial list; a forward-to number list; a preferred interexchange (IXC) carrier; or a selection of optional service features. Thus, an initialized entry like an uninitialized entry includes entry information relating to a subscriber with respect to a service to which the subscriber has subscribed. But unlike an uninitialized entry, an initialized entry also includes subscription information that may be collected as a result of the service being initialized, i.e., turned on. As shown in FIG. 2A, the initialized entry 52 in storage 44 includes information in all sixteen fields of its memory unit. Of course, all of the fields in the memory unit of an initialized entry need not be filled. There may be reserved or unfilled fields that may be used for other purposes than subscription information.

As illustrated in FIG. 2A, storage 44 is filled to capacity with entries. Each of its memory units includes an entry. As noted in the background, it is desirable to obtain capacity in storage 44 for additional entries so additional subscribers may be served. As illustrated by the visual aid provided in FIG. 2A, the inventors recognized there is a lot of space or empty memory in storage 44 as a result of the storage of the entries in the memory units. Referring to FIG. 2A, with each of the five memory units having sixteen fields, there are eighty fields in the storage 44. But only twenty-eight of the eighty fields are filled with information. The other fifty-two fields are empty, and generally will not be filled because they are reserved for subscription information that may be provided when an entry changes its status from an uninitialized entry to an initialized entry.

The inventors also recognized the empty fields in the memory units are associated typically with uninitialized entries. As explained above, an uninitialized entry generally does not come into use except for updates or maintenance until the service associated with the entry becomes initialized. Thus, the entries in storage which generally have the most empty fields and which generally are the least used are the uninitialized entries. The inventors took advantage of these characteristics of uninitialized entries in the exemplary embodiments for obtaining additional capacity in the storage 44.

Exemplary embodiments of the present invention archive uninitialized entries from the storage 44 of the IP 42 to a repository 46, 48 associated with the IP 42. The repository 46, 48 may be a real-time database, and may hold other data not relating to the service associated with the uninitialized entries. Typically, the repository 46, 48 is not associated with the service relating to the uninitialized entries in that an uninitialized entry cannot be initialized in this repository 46, 48. Nevertheless, the repository 46, 48 is readily accessible so that uninitialized entries may be retrieved from the repository 46, 48 to the storage 44 for initialization. This retrieval is transparent to the subscriber, and may be accomplished in a few seconds such as the time between ring cycles provided to a subscriber.

As noted, exemplary embodiments archive uninitialized entries from the storage 44 of the IP 42 to the repository 46, 48. In the exemplary embodiments, the archiving does not simply transfer an uninitialized entry from the storage 44 to the repository 46, 48. Significantly, in the archiving of an uninitialized entry, the entry information in the filled fields of the uninitialized entries is transferred to the repository 46, 48. For example, the three fields 62 of uninitialized entry 50 include the entry information for this entry 50. In archiving this uninitialized entry 50, the entry information in these three fields 62 is transferred to the repository 46, 48. The entry information from these three fields 62 is stored as entry information 62' relating to the uninitialized entry 50 in the repository 46, 48 as illustrated in FIG. 2B. The other fields (or the place holders therefor) are not transferred to the repository 46, 48. To use the vernacular, the memory real estate occupied by an uninitialized entry in the storage 44 corresponds to sixteen units. But in the repository 46, 48, the memory real estate occupied is no more than three units, and possibly less. Moreover, the units in the repository 46, 48 may not be the same size as the memory units in the storage 44, and may be smaller. For example, the entry information in these three fields 62 may occupy a certain amount of space in the memory unit reserved for uninitialized entry 50. In some cases, this entry information may occupy an amount of space in the repository 46, 48 that is less than the certain amount of space occupied by the entry information in storage 44. For example, the entry information may occupy an amount of space in the repository 46, 48 that is 40% of the certain amount of space occupied by the entry information in the storage 44.

Once an uninitialized entry is archived in the repository 46, 48, then the uninitialized entry in the storage 44 of the IP 42 may be deleted. Generally, such deletion occurs by deleting the entry information of the uninitialized entry from the appropriate memory unit in the storage 44. Once the uninitialized entry is deleted, then the memory unit in the storage 44 previously occupied by the uninitialized entry may be filled by another entry such as an initialized entry or another uninitialized entry. In other words, a memory unit reserved in the storage 44 for an entry has become available for use by another entry.

The advantages of the archiving of uninitialized entries are further demonstrated by reference to the four uninitialized entries 50, 54, 56, and 58 illustrated in FIG. 2A as included in storage 44. Each of these uninitialized entries includes three filled fields of entry information 62, 64, 66 and 68. Assume then that archiving of these uninitialized entries has taken place so the entry information 62, 64, 66 and 68 from the uninitialized entries is stored respectively as entry information 62', 64', 66' and 68' in the repository 44 illustrated in FIG. 2B. Advantageously, in this example, all of the entry information 62', 64', 66' and 68' of the uninitialized entries occupies less space in the repository 46, 48 than a single entry occupies in the storage 44. Thus, the repository 46, 48 effectively holds a lot of information in a smaller amount of space in comparison to the storage 44 of the IP 42. In other words, the repository 46, 48 need not have the capacity of the storage 44 to effect the implementation of significant space savings in the storage 44 of the IP 42. By storing the entry information in a format that results in saved space over the specific format used for storing the entry information in a memory unit in storage 44, the use of the repository 46, 48 obtains additional capacity in the storage 44.

As noted, once an uninitialized entry is deleted from the storage 44 of the IP 42, then the memory unit previously occupied by the uninitialized entry in the storage 44 may be filled by another entry such as an initialized entry. Reference is made to FIG. 2C. This figure illustrates an advantageous scenario that may happen as a result of the archiving of the uninitialized entries 50, 54, 56, and 58 to the repository 46, 48. Once these uninitialized entries have been archived, the entry information 62, 64, 66, and 68 as well as the "U" (or other flag or marker) indicating the uninitialized status of the previous entry may be deleted. Once the entry information and flags have been deleted, the memory units are empty and may be used for other entries.

FIG. 2D illustrates an advantageous outcome resulting from the archiving of the uninitialized entries from storage 44 to the repository 46, 48. The memory units that were previously occupied by uninitialized entries 50, 54, 56, and 58 have been filled in FIG. 2D by initialized entries 70, 72, 74, and 76.

Assuming that each of these initialized entries 70, 72, 74 and 76 represents an additional subscriber to the service, then by archiving the uninitialized entries 52, 56, 58 and 60, the IP 42 is able to serve an additional four subscribers within the same amount of storage 44. The IP 42 would have been unable probably to serve these additional subscribers before archiving because of an incapacity with respect to entry storage. In sum, archiving allows for the holding of uninitialized entries in a relatively small area of memory in a repository 46, 48, yet allows for an increase in the number of subscribers served in direct relation to the number of uninitialized entries that have been archived. Further, archiving obtains the additional capacity for the storage 44 without losing the entry information relating to the uninitialized entries that have been archived.

Description of Possible Events That May Lead to Archiving

The decision to archive one or more uninitialized entries may be based on the transpiration of one or more events, or it may be arbitrary. Generally, the capacity of the storage 44 for entries figures prominently in the decision to archive. For example, a decision to archive may be based on the number of total entries reaching a selected threshold. The number of entries may be kept track of by a counter. As another example, a decision to archive may be based on the total number of entries received from the service management system (SMS) 40 or received from the SMS 40 within a period of time. As a further example, a decision to archive may be based on the number of uninitialized entries reaching a selected threshold. As yet another example, a decision to archive may be based on a need to effect load sharing with other network elements. As a further example, archiving may be enabled so that it is "on" for a selected period of time, until a specified number of entries are received, or until the decision is unenabled. As an additional example, archiving may be enabled so that it happens periodically such as once a day.

Figure 3:
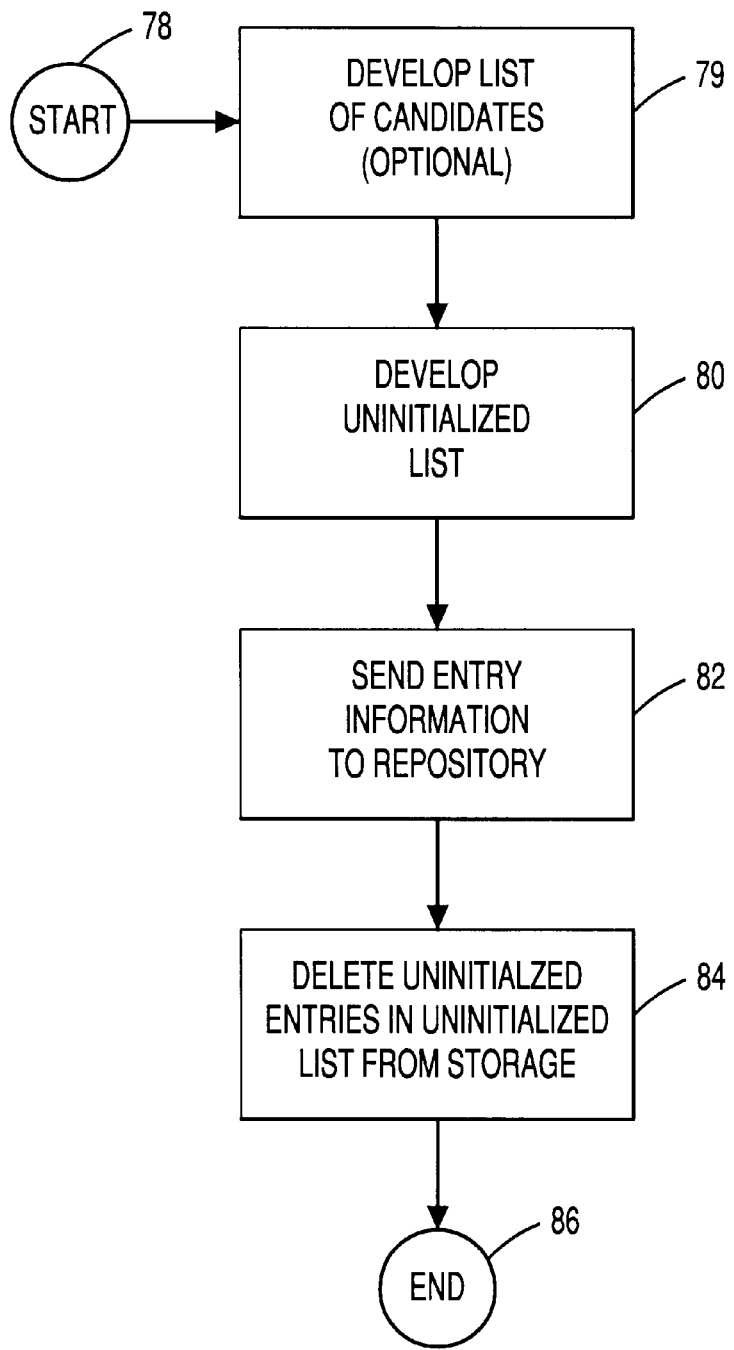
FIG. 3 is a flow chart of an exemplary method of archiving.

An Exemplary Method of Archiving Using a List of Candidates—FIG. 3

Archiving may be considered to generally include the steps described below of developing an uninitialized list including uninitialized entries, sending the entry information for each of the uninitialized entries in the uninitialized list to the repository 46, 48, and deleting each of the uninitialized entries in the uninitialized list from the storage 44.

As an optional preliminary step to archiving, after start step 78 in FIG. 3, a list of candidates for archiving may be developed in optional step 79. This list of candidates may correspond to all or less than all of the uninitialized entries in the storage 44 that are candidates for archiving. As is explained below, the list of candidates may serve as the basis for the development of the uninitialized list. As such a basis, the list of candidates may provide a short cut to quicker archiving. For example, an exemplary embodiment of the present invention may provide for archiving only when the number of uninitialized entries in storage exceeds a preselected number of such uninitialized entries. The storage 44 may exceed this preselected number during a busy time of operation of the intelligent peripheral 42 or other element of the telecommunications system. Thus, it is to the benefit of the telecommunications system that archiving during this busy time be accomplished as quickly as possible. If a list of candidates has already been developed, then archiving may move more quickly along. In other words, development of a list of candidates provides a shortcut to later archiving.

The list of candidates may be developed periodically such as once a day during a relatively slow time of operation of the relevant elements of the telecommunications system. Alternatively, the development of the list of candidates may be triggered based on any of the events or reasons described above that lead to a decision to archive entries. Generally, a list of candidates may be developed in connection with the archiving system through operation of the processor 47 and/or a service package application (SPA). The list of candidates typically is stored in storage 44 until the list of candidates is called into use in archiving.

As noted, the list of candidates includes candidates that correspond to uninitialized entries in storage 44. Each candidate in the list of candidates need not include the same entry information as the uninitialized entry to which it corresponds. Rather, each candidate may include only an identifying characteristic with regard to its corresponding uninitialized entry. The identifying characteristic is used to find the corresponding uninitialized entry in storage 44 when archiving is to take place. For example, each candidate in a list of candidates may include respectively only the directory number (DN) of its corresponding uninitialized entry. Advantageously, the optional step 79 of developing a list of candidates provides a shortcut to later archiving. As a further advantage, the list of candidates may provide such a shortcut without the use of much memory in storage (or other memory) through the use of an identifying characteristic for an uninitialized entry. Optional sub-steps to the development of a list of candidates are described below in connection with FIG. 4.

A relatively lengthy period of time may pass after the development of a list of candidates and the next step in archiving. For example, the list of candidates may be developed, and a need to archive may not arise for several days. On the other hand, archiving may follow hard on the heels of the development of the list of candidates. As illustrated in FIG. 3, after development of the list of candidates, the next step 80 in archiving is the development of a list of uninitialized entries. For brevity, this list is also referred to as the uninitialized list. True to its name, the list includes uninitialized entries. Of course, the list may at times include only a single uninitialized entry. Generally, the uninitialized entry list may be developed in connection with the archiving system through operation of the processor 47 and/or a service package application (SPA). The uninitialized list generally is stored in storage 44 as it is composed and used in archiving.

Each uninitialized entry in the list of uninitialized entries generally includes only entry information. The inclusion of only the entry information for an uninitialized entry in the uninitialized list is different from the manner in which the uninitialized entry is stored in the storage 44. As noted, the uninitialized entry is stored in the storage 44 in a reserved memory unit and generally stored in a specific format in the memory unit. When the entry information for the uninitialized entry is included in the list of uninitialized entries, the entry information is not stored in the specific format in the list. By this difference, space is saved with respect to the holding of the entry information of an uninitialized entry. Additional optional sub-steps to the development of an uninitialized list are described below in connection with FIG. 4.

After the uninitialized list is developed, then in step 82 the entry information for each of the uninitialized entries in the uninitialized list is sent from the storage 44 to the repository 46, 48. In exemplary embodiments, the uninitialized list is not retained in storage 44 after the entry information for each of the uninitialized entries in the uninitialized list is sent to the repository 46, 48. Alternatively, the uninitialized list may be retained in storage 44 for a limited period of time or for some other reason or cycle. In step 84, the uninitialized entries in the uninitialized list are deleted from the storage 44 of the IP 46, 48. In particular, each of the uninitialized entries in the uninitialized list typically includes only entry information that is held in a memory unit reserved in storage 44. By this deletion, this entry information for each of the uninitialized entries is erased from the appropriate memory unit reserved in storage 44. Advantageously, this deletion frees up room in the storage 44 for additional entries. Another advantage is that this deletion does not lead to the loss of this entry information, which is retained in the repository 46, 48.

In exemplary embodiments, the entry information for each of the uninitialized entries in the uninitialized list that had been sent from the storage 44 to the repository 46, 48 is stored in the repository 46, 48 of the intelligent peripheral 42. Advantageously, this entry information is typically stored in less space in the repository 46, 48 than had been reserved respectively in the storage 44 for the uninitialized entry.

Figure 4:
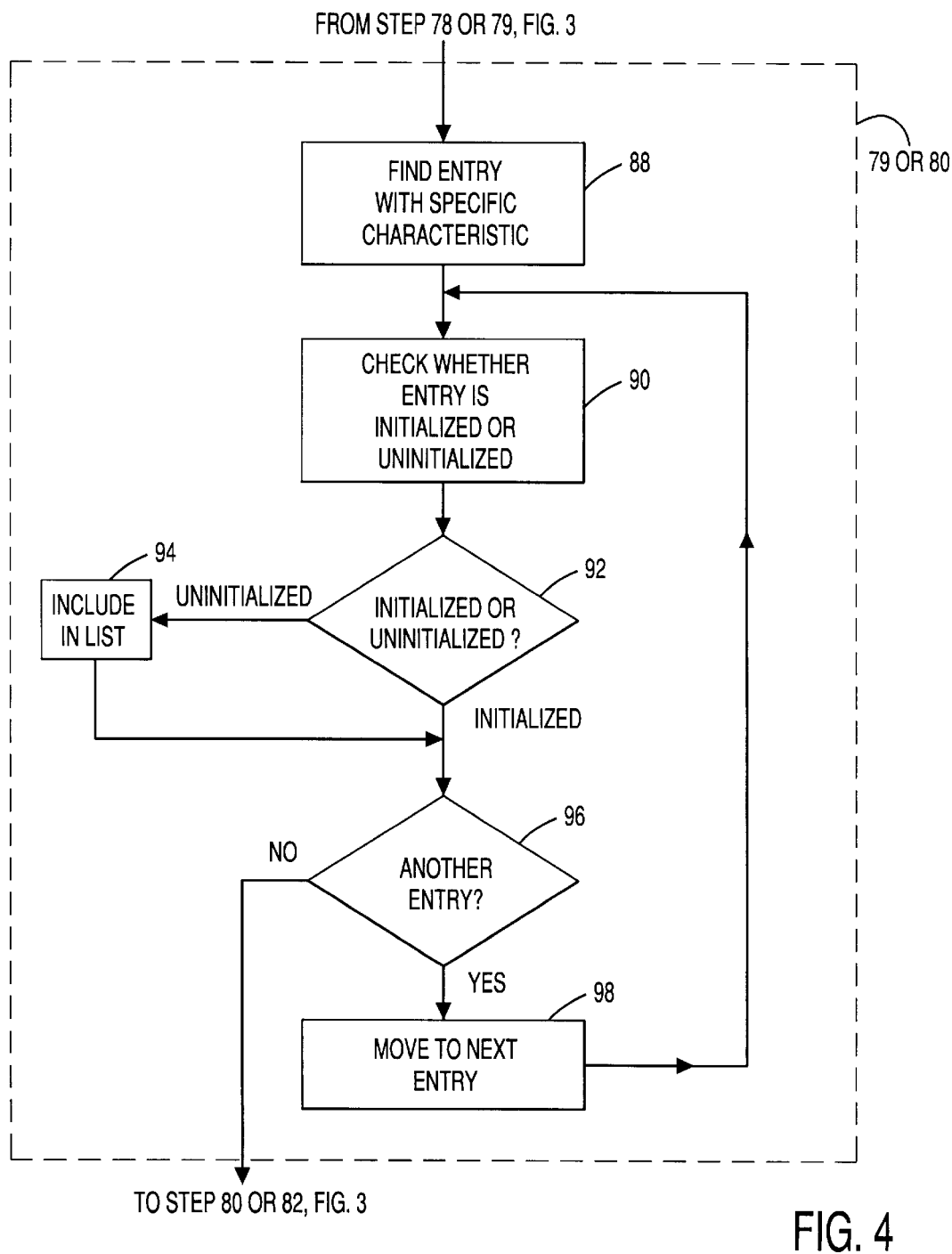
FIG. 4 is a flow chart including optional additional steps relating to the list development step of the exemplary method of FIG. 3.

Exemplary Methods of Developing a List of Uninitialized Entries or List of Candidates—FIG. 4

As noted in the exemplary method of archiving, optionally, a list of candidates for archiving may be developed. As also noted, a list of uninitialized entries is developed in archiving. Either of these lists may be developed pursuant to exemplary methods described below including the exemplary method illustrated in FIG. 4. Generally, if the list of candidates is developed pursuant to the methods described below such as the method illustrated in FIG. 4, then the development of the uninitialized list may be based directly on the list of candidates. In other words, there is no need to repeat the same method for both of the lists. The uninitialized entries in the uninitialized list may correspond directly to the candidates on the list of candidates. In some cases, however, the list of candidates may be considered to be over-inclusive such as in the case where the list of candidates includes as candidates all of the uninitialized entries in storage 44. In that case, the uninitialized list may be developed pursuant to the exemplary methods described below such as the method illustrated in FIG. 4 so as to limit the number of uninitialized entries that are sent to the repository. As yet another alternative, the list of candidates may be developed pursuant to the exemplary methods described below such as the method illustrated in FIG. 4 by using a first specific characteristic with respect to each entry. The uninitialized list then may be developed pursuant to the exemplary methods such as the method illustrated in FIG. 4 (possibly omitting some of the steps such as steps 90, 92, 94) by using a second specific characteristic with respect to each entry. The second use of a method to develop a list is to reach a subset of uninitialized entries pulled from the set of uninitialized entries found in the first use of a method to develop a list.

For brevity, the exemplary methods such as the method illustrated in FIG. 4 are generally described as though an uninitialized list is being developed (step 80 of FIG. 3). Where the description for the development of a list of candidates would differ (step 79 of FIG. 3), a notation is made. Thus, the term "list" is used synonymously in the description of the exemplary methods such as the method illustrated in FIG. 4 with the terms "list of candidates" and "uninitialized list" unless noted.

In a first exemplary method, a list may be developed through a review of each of the entries in the storage 44 of the IP 42. As noted, each entry in the storage 44 includes a flag or other marker to indicate whether it is an initialized or an uninitialized entry. The list is developed by checking the flag to see whether the entry is to be included in the list. For example, the list may be developed by including the first 500 uninitialized entries found in the check of the flags of the entries. In a second exemplary method, a list may only include a single or other limited number of uninitialized entries that are selected arbitrarily from the uninitialized entries found in storage 44.

In another exemplary method, a list may be developed so as to include uninitialized entries having a specific characteristic. An example of such a characteristic may be a selected age. With respect to the age characteristic, the decision to include an uninitialized entry in a list may be made on the basis of the length of time the entry has gone uninitialized. This is referred to herein as the "age" of the uninitialized entry. Thus, in the course of developing the list, a check may be conducted to determine whether the age of the uninitialized entry is older than a selected date and/or time. Each entry upon creation may be provided with the date and/or time of its creation (or some other starting time) and this temporal information may be included in a field of the entry, and particularly, in the entry information of the entry. A check of this temporal information is made against a selected date and/or time. If the age is older, then the uninitialized entry is included in the list. If the uninitialized entry is not older than a selected date and/or time, then the uninitialized entry is not included in the list.

An additional exemplary method to include uninitialized entries having a specific characteristic in a list is illustrated in FIG. 4, which is a flow chart showing sub-steps to the develop list of candidates step 79 or develop uninitialized list step 80 of FIG. 3. The exemplary method in FIG. 4 develops a list by first including uninitialized entries having the specific characteristic such as the earliest sequence numbers. A sequence number is typically assigned to an entry at its creation and this sequence number is stored in a field of the entry, such as the entry information of the entry. Effectively, by including uninitialized entries having the earliest sequence numbers, this exemplary method develops the list beginning with the oldest uninitialized entries as is explained below.

Pursuant to this exemplary method, in step 88, FIG. 4, the entry in storage 44 with the specific characteristic such as the earliest sequence number is found. In step 90, a check is made to determine whether the entry is initialized or uninitialized. If the check step 92 determines the entry is uninitialized, then in step 94 it is included in the list. This uninitialized entry is the oldest in storage 44 and the first to be included in the list. As the oldest uninitialized entry, it may be the least likely to be called into service, i.e., initialized. Thus, the oldest (and older) uninitialized entries are generally the best candidates for archiving. They are otherwise occupying space in storage 44 that may be more usefully used by newer entries. After including the uninitialized entry in the list, then this exemplary method moves to step 96 as explained below.

Referring again to step 92 wherein a check is conducted as to whether the entry is initialized or uninitialized, if the entry is initialized then in step 96 a check is made to determine whether there is another entry to be checked. For example, the method may have been applied to all of the entries that are contained in storage 44. Alternatively, the method may have been set to review only a selected number of entries. For example, the method may have been set to review only the first 500 entries in storage. Alternatively, the method may have been set to review only enough entries so that a total of 500 uninitialized entries are included in the list. If the check step 96 is negative in that no further entries are to be reviewed, then the list is complete and the method continues with step 80 or step 82 of FIG. 3. If the check step 96 is positive in that there is another entry to review, then the method returns to step 90 to check the next entry. Preferably, the next entry is the entry with a specific characteristic such as a sequence number that immediately follows the sequence number of the previously checked entry.

Advantageously, by checking for an early sequence number as a specific characteristic, the exemplary method illustrated in FIG. 4 develops a list of candidates or an uninitialized list that includes the oldest of the uninitialized entries in storage 44 of the IP 42. In addition, the list is developed so the uninitialized entries are listed in order of age through the checking of the sequence numbers.

Figure 5:
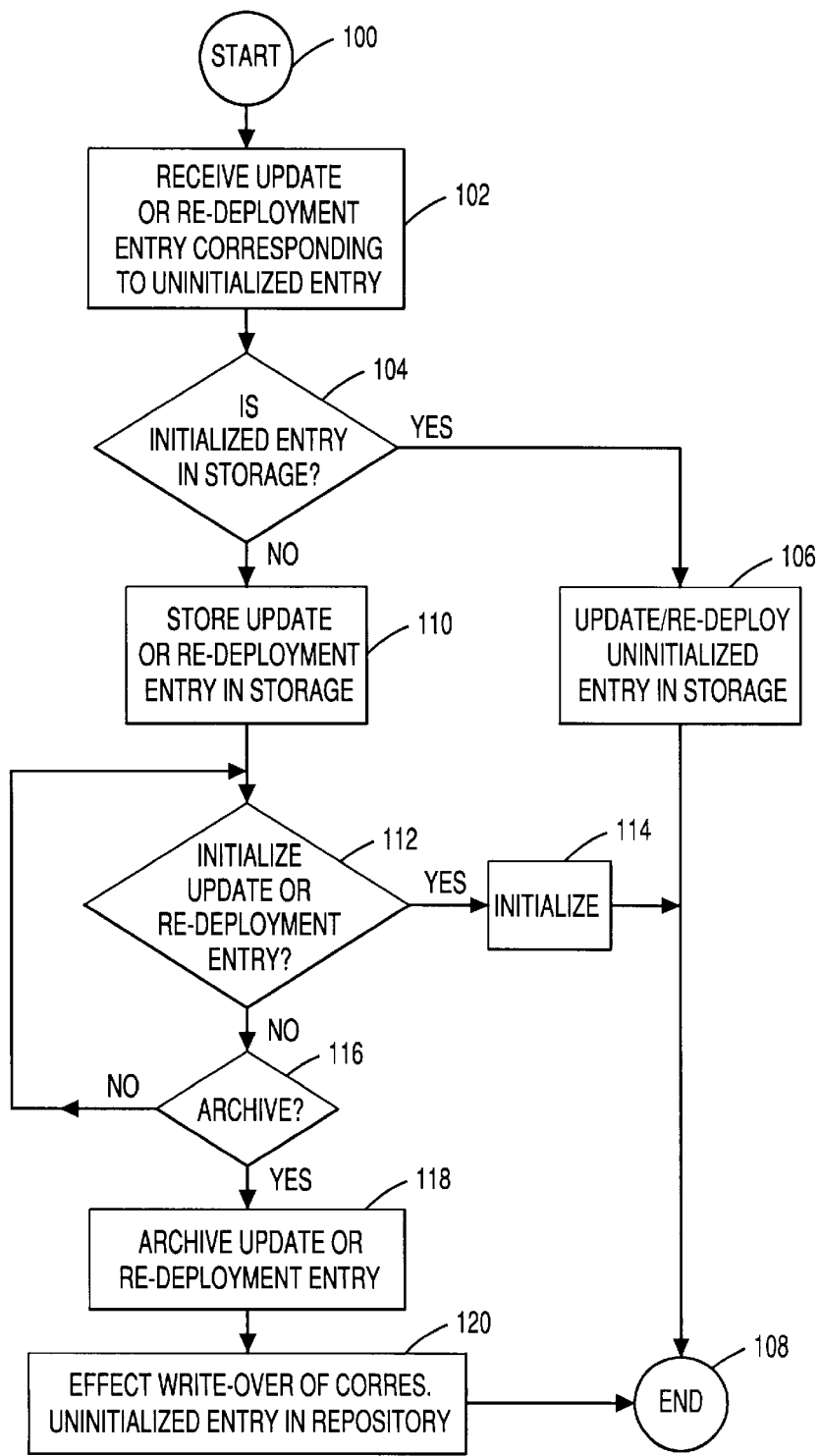
FIG. 5 is a flow chart of an exemplary method of updating uninitialized entries.

Exemplary Method of Updating Uninitialized Entries—FIG. 5

The exemplary methods above of archiving generally relate to entries included in the storage 44 of the IP 42 prior to such archiving. Generally, new entries and updates to entries are continually being received by the storage 44. In some cases, a storage 44 may be enabled to reject a new entry. Such enabling may occur if the storage 44 is filled to capacity or for other reasons. Unless rejected, upon receipt a new entry is stored in storage 44. A new entry is an uninitialized entry until initialization takes place. As an uninitialized entry, this new entry is a candidate for the list of candidates and/or the uninitialized list including uninitialized entries to be sent to the repository 46, 48.

Storage 44 also receives updates. An update includes update information pertaining to an entry. Such update information may include: a change of area code for a subscriber's directory number; a change to a personal identification number (PIN); changes or additions to a speed dial list or a forward-to number list; etc. The update does not have to, and typically does not, include all of the information that would be found in the fields of an entry. The update information usually is used to "update" the entry by correcting or changing some of the entry information to make it current, and not to revamp the entire entry. In addition, the update generally is received so the update information may most readily update the entry in its specific format in the memory unit reserved in storage 44. After an entry has been updated, it may be an updated initialized entry or an updated uninitialized entry.

Storage 44 also receives re-deployment entries. An entry may be re-deployed in that a re-deployment entry may be received that corresponds to an entry. A re-deployment entry typically includes re-deployment information which is used to completely replace the information in an entry. Thus, a re-deployment entry for an uninitialized entry includes replacement of entry information, and for an initialized entry includes replacement of entry information and subscription information. Re-deployment of one or more entries in storage may take place as a result of general problems with the data or information, and/or specific problems with a particular entry. In addition, re-deployment may take place with respect to an entry when the subscriber subscribes to new features of a service, as well as for other reasons. Further, the re-deployment entry generally is received so the re-deployment information may most readily replace the entry in its specific format in the memory unit reserved in storage 44.

As explained in detail above, exemplary embodiments of the present invention advantageously obtain capacity in storage for additional entries through archiving of uninitialized entries to a repository 46, 48. The exemplary updating/re-deployment methods described below in connection with FIG. 5 provide mechanisms by which the advantages of archiving are retained, and the entries are updated or re-deployed as appropriate to provide a high level of service to the subscriber.

When an update or re-deployment entry is received by the storage 44, the update information or re-deployment information is written over the appropriate information in the entry in storage 44. By this write-over, the entry contains the update information or re-deployment information in place of the information that was included in the entry. This write-over is executed so as to accord with the specific format of the entry in the memory unit in storage 44. For example, an update to an entry updates the appropriate information in the appropriate fields in the entry which is held in storage 44. But pursuant to the exemplary methods of archiving described above, the entry to which an update or re-deployment entry relates may not be found in storage 44. The update or re-deployment entry may correspond to an uninitialized entry that has been sent to the repository 46, 48. The update or re-deployment entry generally may not be simply transmitted to the repository 46, 48. Thus, the repository 46, 48 is unable to effect write-over by the update or re-deployment entry on the corresponding uninitialized entry because of the specific format of the update or re-deployment entry. Yet, the update or the re-deployment entry generally should not be ignored.

As illustrated in FIG. 5, the present invention includes an exemplary method whereby an update or a re-deployment entry corresponding to an uninitialized entry in the repository 46, 48 may be retained for use with the subscriber's service. After start step 100 and after step 102 including the receipt of an update or re-deployment entry corresponding to an uninitialized entry, a check is made in step 104 to determine whether the uninitialized entry is held in storage 44. If so, then in step 106 the update or re-deployment entry is used to update or to re-deploy the uninitialized entry in storage 44, and the method ends in step 108.

On the other hand, if the uninitialized entry is not held in storage, then in step 110 the update or re-deployment entry is stored in storage 44. With respect to an update, the update generally includes a re-write of all of the information in the entry including updated information as appropriate. Thus, an update may be stored as an updated uninitialized entry in the storage 44. In this example of the method, this update or re-deployment entry is an uninitialized entry, and as such, it is usually held in storage 44 until it is initialized as described below in connection with step 114 or archived as described below in connection with step 118.

When such an initialization request is received, a check is first made of the storage 44 to find the relevant entry. As explained below in connection with FIG. 6, if the relevant entry is not found in storage 44, then the entry information relating to the relevant entry is retrieved from the repository 46, 48. But in this example, the update or re-deployment entry is found first in the storage 44. Initialization of the update or re-deployment entry may take place based on this update or re-deployment entry. It is advantageous that the update or re-deployment entry is found first rather than retrieving the entry information of the corresponding uninitialized entry from the repository 46, 48. It is advantageous that the update or re-deployment entry is used for the initialization because the update or re-deployment entry typically includes the most current information with respect to the subscriber's services.

As noted above, the exemplary method in step 110 stores the update or re-deployment entry in storage 44 until the update or re-deployment entry is initialized or archived in the repository 46, 48. A check in step 112 for initialization results in a positive finding if an initialization request has been received with respect to the update or re-deployment entry corresponding to the subscriber initiating the initialization request. In step 114, the update or re-deployment entry is initialized so as to create an initialized entry, and the method ends in step 108. The initialized entry corresponding to the previous update or re-deployment entry is ineligible for archiving.

On the other hand, no initialization request may be received with respect to the update or re-deployment entry until a decision regarding archiving in step 116 is reached. If the update or re-deployment entry is not selected for archiving, then the method returns to step 112 to await initialization or archiving. If the update or re-deployment entry is to be archived, then in step 118 the update or re-deployment entry is archived. Such archiving generally may follow the exemplary methods described above in connection with FIGS. 2A–D, 3 and 4. For example, the update or re-deployment entry may be included as an uninitialized entry in the uninitialized list. The entry information of the update or re-deployment entry may be sent from the storage 44 to the repository 46, 48, and the entry information of the update or re-deployment entry may be deleted from storage 44. As noted, entry information of an uninitialized entry corresponding to the update or re-deployment entry is present in the repository 46, 48 as a result of having been previously archived. So, as illustrated in step 120 of FIG. 5, the entry information of the update or re-deployment entry is written over the entry information of the uninitialized entry to which the update or re-deployment entry corresponds in the repository 46, 48. In this manner, the repository 46, 48 includes entry information of an uninitialized entry with the most current information relating to a subscriber's service. After this re-write, the method ends in step 108.

Advantageously, this exemplary method allows the intelligent peripheral 42 to retain the most current information with respect to an entry and yet take advantage of the archiving methods to obtain capacity in the storage 44. In particular, this exemplary method retains an update or a re-deployment entry in storage 44 or through archiving uses the update or re-deployment entry to update the entry information of the corresponding uninitialized entry in the repository 46, 48.

Figure 6:
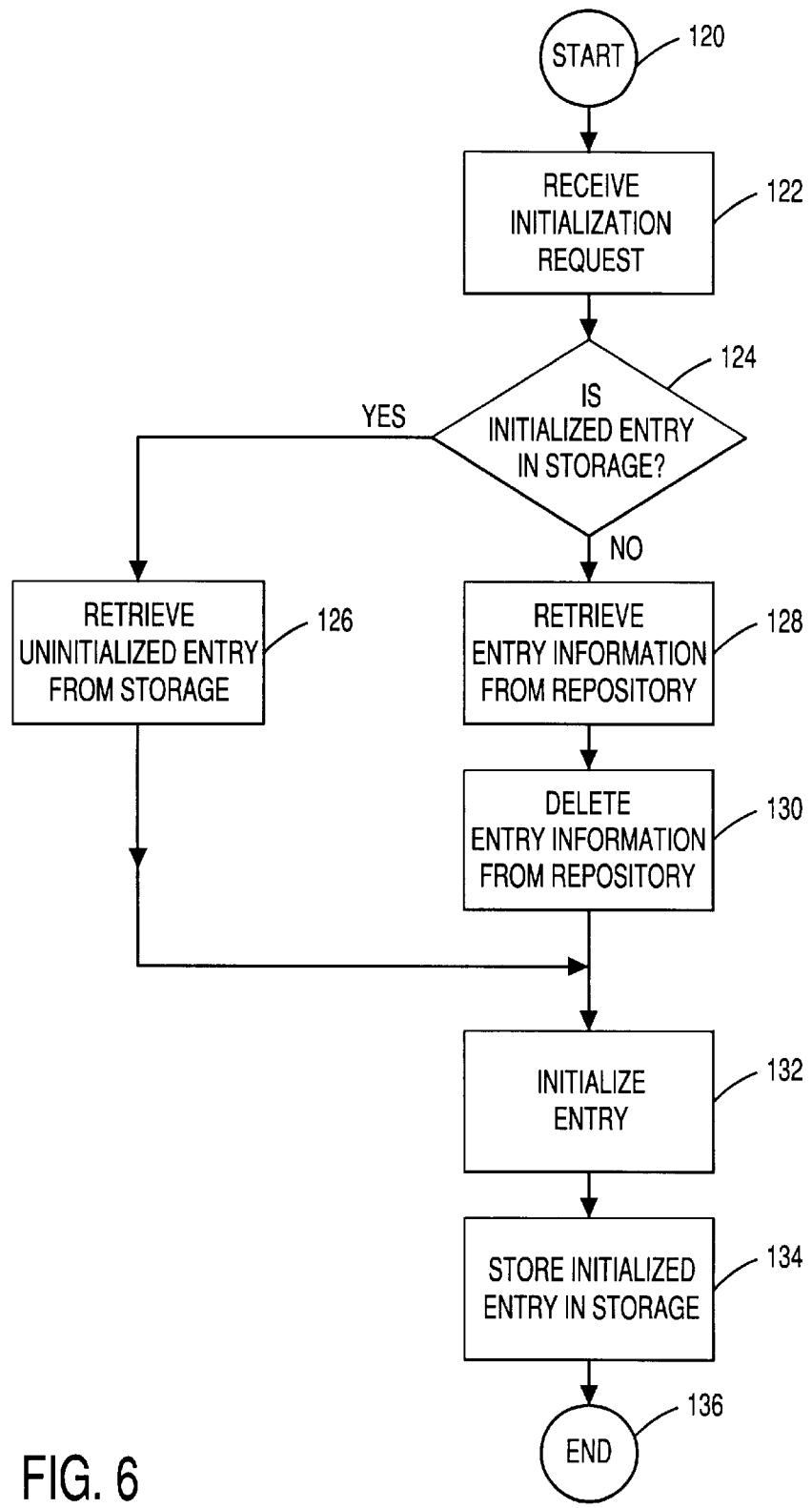
FIG. 6 is a flow chart of an exemplary method relating to the retrieval of an uninitialized entry.

Retrieval of Uninitialized Entry—FIG. 6

As described above, entry information of an uninitialized entry may be archived so that the entry information is sent from the storage 44 to the repository 46, 48. The uninitialized entry is deleted from the storage 44. The occasion may arise when the entry information of the uninitialized entry must be retrieved from the repository 46, 48 so that initialization may take place. For example, a subscriber may decide to "turn-on" his or her service, and subscription information is collected from the subscriber and added to the entry information so as to have an initialized entry in storage 44 for the subscriber. An exemplary method for the retrieval of the entry information of an uninitialized entry in response to an initialization request is illustrated in FIG. 6. Pursuant to this exemplary method, after start step 120 and after receipt of the initialization request in step 122, a check is made in step 124 to determine whether the uninitialized entry associated with the request is in storage 44. If the uninitialized entry is in storage 44, then in step 126, the uninitialized entry is retrieved from storage 44 and the exemplary method continues to step 132, which is described below.

If the uninitialized entry is not in storage 44, then the entry information of the uninitialized entry is in the repository 46, 48. In step 128 the entry information of the uninitialized entry is retrieved from the repository 46, 48. The entry information typically includes a directory number relating to the subscriber, and thus, the directory number may be used as a key to retrieve the entry information. Thus, as part of the retrieval step 128 the entry information may have to be re-formatted so that it conforms to the specific format of entries that are stored in memory units reserved in storage 44. In step 130, the entry information of the uninitialized entry is deleted from the repository. Advantageously, this deletion of the entry information of the uninitialized entry once its been retrieved to storage 44 makes for more room in the repository 46, 48.

In step 132, the retrieved entry from storage 44 or the retrieved entry information from the repository 46, 48 is initialized and in step 134 is stored as an initialized entry in storage 44. The method ends in step 136.

Advantageously, this exemplary method quickly retrieves the entry information of uninitialized entries from the repository 44 which is readily accessible so the retrieval adds only a minimum amount of time that it otherwise takes to initialize an uninitialized entry held in storage 44.

Given the foregoing disclosure of exemplary embodiments of the present invention, other embodiments will suggest themselves to those skilled in the art. Therefore, the scope of the present invention is to be limited only by the claims below.

We claim:

1. In an intelligent peripheral having a storage and a repository, the storage including initialized entries and uninitialized entries, and the repository including entry information for other uninitialized entries, a method for responding to an initialization request, comprising the steps of:
 A. receiving an initialization request with respect to an uninitialized entry;
 B. determining the entry information of the uninitialized entry that is held in the repository;
 C. retrieving the entry information of the uninitialized entry from the repository to the storage;
 D. initializing the uninitialized entry by adding initialization information to the entry information so as to create an initialized entry; and
 E. storing the initialized entry in the storage.

2. The method of claim 1, wherein the entry information comprises a directory number; and
 wherein step C comprises retrieving the entry information by using the directory number.

3. The method of claim 1, further comprising, after step D, the step of deleting the entry information from the repository.

4. In an intelligent peripheral having a storage and a repository, the storage including initialized entries and uninitialized entries, and the repository including entry information for other uninitialized entries, a method for responding to receipt of an update for an uninitialized entry, comprising the steps of:
 A. receiving an update corresponding to uninitialized entry, the update being an updated uninitialized entry by having updated information with respect to the uninitialized entry;
 B. determining the entry information of the uninitialized entry that is held in the repository; and
 C. storing the update in the storage.

5. The method of claim 4, further comprising the steps of:
 D. receiving an initialization request with respect to the uninitialized entry;
 E. determining the update in the storage that corresponds to the initialization request;
 F. initializing the update so as to create an initialized entry; and
 G. storing the initialized entry in the storage.

6. The method of claim 4, further comprising the steps of:
 D. including entry information of the update in an uninitialized list;
 E. sending the entry information of the update from the storage to the repository;
 F. deleting the update from the storage; and
 G. effecting a write-over of the entry information of the update over the entry information of the uninitialized entry in the repository,
  whereby the entry information of the uninitialized entry in the repository is updated as a result of the write-over by the entry information of the update.

* * * * *